United States Patent

Brian

[11] Patent Number: 5,758,883
[45] Date of Patent: Jun. 2, 1998

[54] DIFFERENTIAL THREAD COLLET ACTUATION

[76] Inventor: Frank J. Brian, 3701 Ahern St., Baldwin Park, Calif. 91706

[21] Appl. No.: 671,173

[22] Filed: Jun. 27, 1996

[51] Int. Cl.[6] .................................................. B23B 31/20
[52] U.S. Cl. ........................ 279/53; 279/46.2; 279/46.3; 279/46.4; 279/51
[58] Field of Search ..................... 279/51–53, 48, 279/49, 46.4, 46.1–46.3

[56] References Cited

U.S. PATENT DOCUMENTS

| | | | |
|---|---|---|---|
| 493,231 | 3/1893 | Muir | 279/49 |
| 3,652,100 | 3/1972 | Baturka | 279/51 |
| 4,479,666 | 10/1984 | Welsh | 285/4 |
| 4,603,889 | 8/1986 | Welsh | 285/175 |

FOREIGN PATENT DOCUMENTS

| | | | |
|---|---|---|---|
| 149834 | 7/1951 | Australia | 279/53 |
| 398390 | 6/1909 | France | 279/52 |
| 1062108 | 3/1967 | United Kingdom | 279/53 |

*Primary Examiner*—Steven C. Bishop
*Attorney, Agent, or Firm*—William W. Haefliger

[57] ABSTRACT

An apparatus for adjusting the grip of a tubular collet upon work, the collet receivable in a bore formed by a holder, and comprising a rotatable connector member having first and second thread connections to the collet and to the holder, respectively; the thread connections characterized as differential, with respect to the collet and to the holder, whereby as the member is rotated, the collet closes toward the work, with high mechanical advantage.

10 Claims, 3 Drawing Sheets

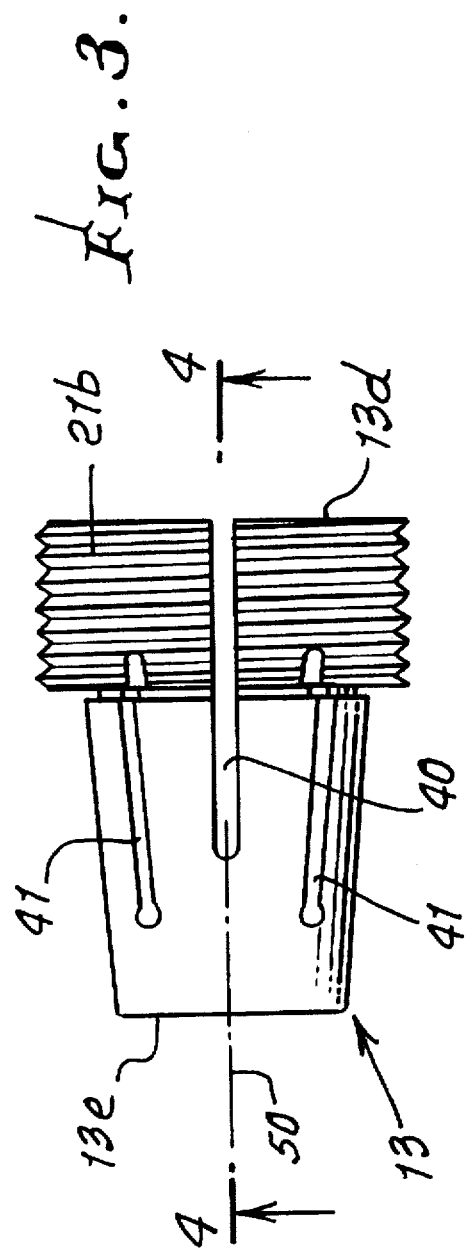
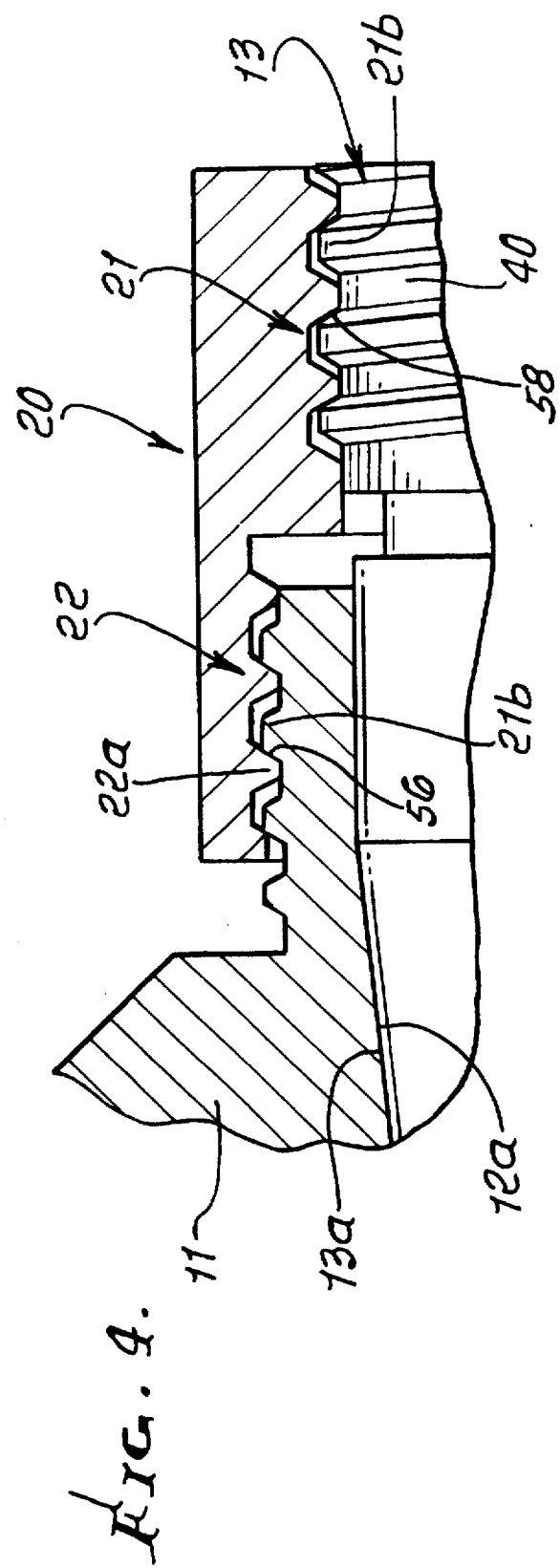

DIFFERENTIAL THREAD COLLET ACTUATION

BACKGROUND OF THE INVENTION

This invention relates generally to collet support of work, such as machine tool shafts or shanks, and more particularly to fine adjustment of such shanks, as during connection and disconnection of tool shanks to and from collets.

Connection of machine tool shanks, as for example milling tool shanks, to collets for support during rotary milling, requires that the collets be precision connected to the rotary bodies of tool holders. This requires accurate, forcible, axial displacement, i.e., jamming, of conical portions of collets into conical bores of such holders, for frictional interconnection. A high degree of axial force is thereby required; and, when the tool shank is to be removed, a high degree of collet extraction axial force is required to break the frictional interconnection.

There is need for improved means to supply such axially oppositely directed forces to establish, and to break the frictional interconnections referred to, and in an accurate and easily applied manner. There is also need to provide for improved connections of collets to work holders, to enable establishment and breakage of the frictional interfits referred to.

SUMMARY OF THE INVENTION

It is a major object of the invention to provide improved apparatus meeting the above needs.

Basically, apparatus is provided for adjusting the grip of a tubular collet upon work, the collet receivable in a bore formed by a holder, comprising in combination:

a) a rotatable connector member having first and second thread connections to the collet and to the holder, respectively, b) the thread connections characterized as differential, with respect to the collet and to the holder, whereby as the member is rotated, the collet closes toward the work, with high mechanical advantage.

As will be seen, the rotatable differential connector member may be located at least in part externally of the collet-receiving bore, or at least partly within that bore.

It is another object to provide for an extremely compact assembly, wherein the collet has at least one slit therein which reduces in width as the collet is urged toward the work; and further wherein that slit intersects at least one of the first and second thread connections on the collet. As will be seen, multiple such collet slits may intersect first and second differential thread connections on the collet. In this regard, the first and second thread connections have first and second threads, respectively, the first thread having first pitch, and the second thread having second pitch, the first and second pitches being different.

Another object is to provide a differential thread connector for a collet and a work holder, wherein a first thread connection includes first threads having first load flanks which face in one axial direction, and the connector second thread connection includes second threads having second load flanks which face in the opposite axial direction, the first flanks defining a first pitch and the second threads defining a second pitch, the pitches being different.

As will be seen, the first and second threads define a common axis, the first threads being at a first radial distance from that axis, and the second thread being at a second radial distance from that axis, the first and second radial distances being different, for compactness.

These and other objects and advantages of the invention, as well as the details of an illustrative embodiment, will be more fully understood from the following specification and drawings, in which:

DRAWING DESCRIPTION

FIG. 3 is an elevation showing a collet of the type used in the FIG. 1 assembly; and FIG. 4 is an enlarged section showing differential first and second threads, adjustably interconnecting a collet, work holder and rotary connector.

DETAILED DESCRIPTION

Figure 1:
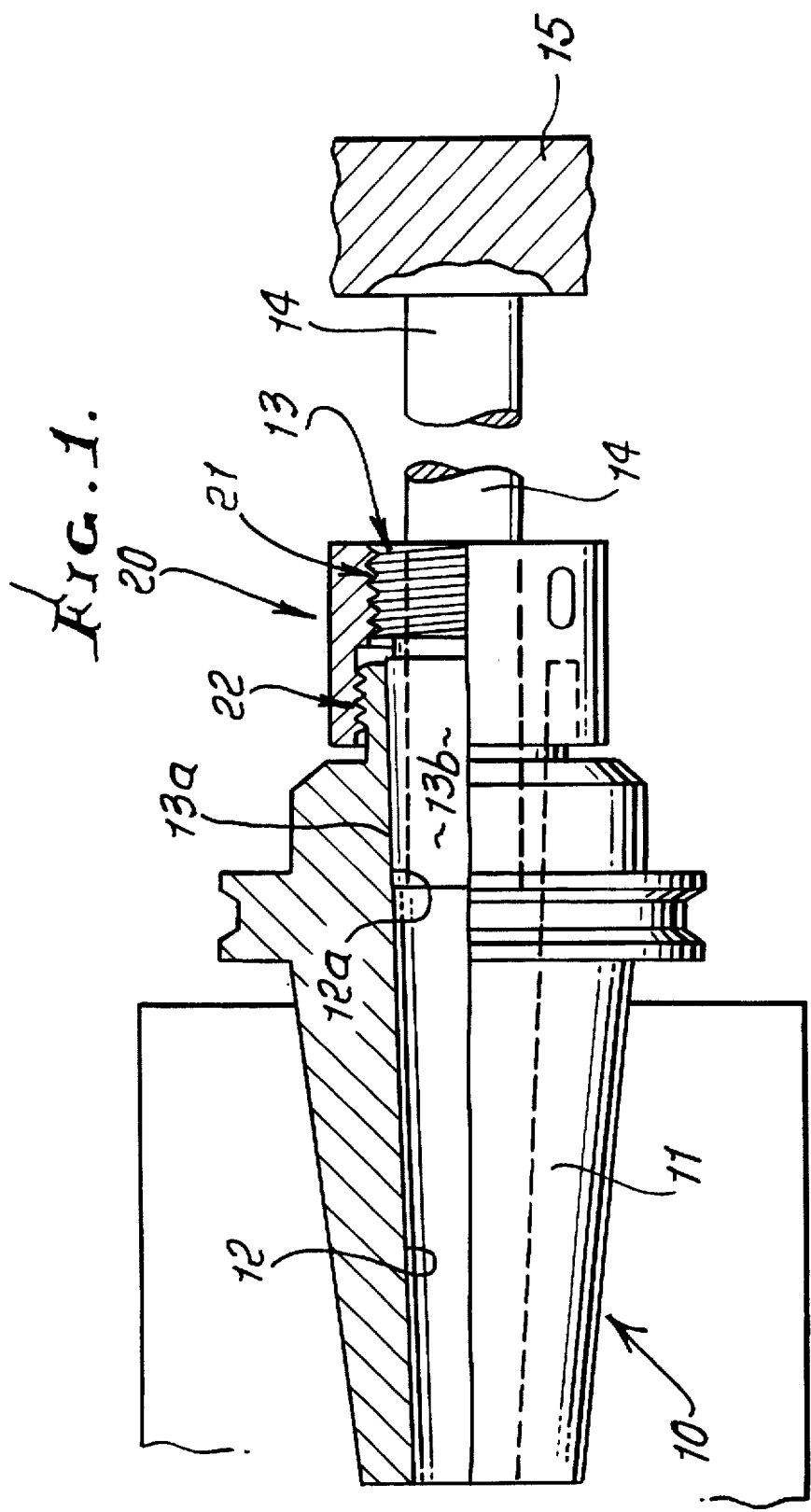
FIG. 1 is an axial, partly cut-away view showing one form of collet, tool holder and differential connector assembly.

As shown in FIGS. 1, 3 and 4, a work holder 10 has an annular body 11, and an axial bore 12 into which a collet 13 is endwise receivable. That bore is shallowly tapered at 12a to receive the matching externally tapered surface 13a of the collet, for frictional engagement therewith, as the conical end 13b of the collet is inserted endwise into the bore.

The collet is adapted to grip a shank 14 of a rotary tool 15, to hold and position the tool during a cutting operation, as for example, milling. Other type tools may be employed. In this regard, the collet must be inserted with sufficient axial force to be displaced radially inwardly, so as to grip the shank surface for positive conical positioning, during cutting; also the jammed frictional interfit at 17 must be capable of being broken or released during tool replacement.

In accordance with the invention, a rotatable connector member is provided to have first and second thread connections to the collet and to the work holder, respectively, such thread connections characterized as differential, with respect to the collet and to the holder, whereby as the connector member is rotated, the collet closes toward the work.

Such differential thread connection enables a relatively small axial displacement of the collet in response to a relatively large degree of differential nut rotation, i.e., with a very high mechanical advantage, that is, easy development of a high degree of axial force to jam the collet into the work holder taper, to grip the work shank, and conversely, easy development of a high degree of reverse axial force to release or "break" the collet from the work holder taper, to release the work shank.

As shown in FIGS. 1 and 4, the rotary differential connector 20 is in the form of a sleeve having first and second coaxial differential thread connections at 21 and 22 to the collet and to the holder, respectively. See for example in FIG. 4 connector internal first thread 21a meshing with collet external first threads 21b at the location of the first thread connection 21; and the connector internal second threads 22a meshing with the work holder external second threads 22b at the location of the second thread connection. When the collet first frictionally engages the work holder at tapered surfaces 12a and 13a, and the connector 20 is rotated in one direction, the collet is advanced to the left in FIG. 4, to increasingly push (jam) into the taper 12b, developing force acting to urge the collet radially inwardly to frictionally grip the work shank, such great force development being easily achieved due to the high mechanical advantage differential thread connection at 21 and 22; conversely, easy development of a high degree of reverse force (pull) on the collet is achievable, to break the frictional interlock at 12a and 13a, upon reverse rotation of the connector 20.

Note in this regard that these advantages are achieved despite use of a collet having at least one, and preferably several, slits or splits, extending as at 40 and 41, as seen in FIGS. 3 and 4. Radial and axial slits 40 may extend to the right end 13*d* of the collet, as seen in FIG. 3; and slits 41 extend rightwardly from locations spaced from the left end 13*e* of the collet, to intersect threads 21*b*. Other slit or split orientations may be provided. Such multiple slits reduce in gap width, as the collet is jammed into the work holder taper, and multiple slits 40 intersect and cut through differential threads 21*b*, as shown. Slits 40 and 41 alternate about the axis 50 of the collet.

Figure 2:
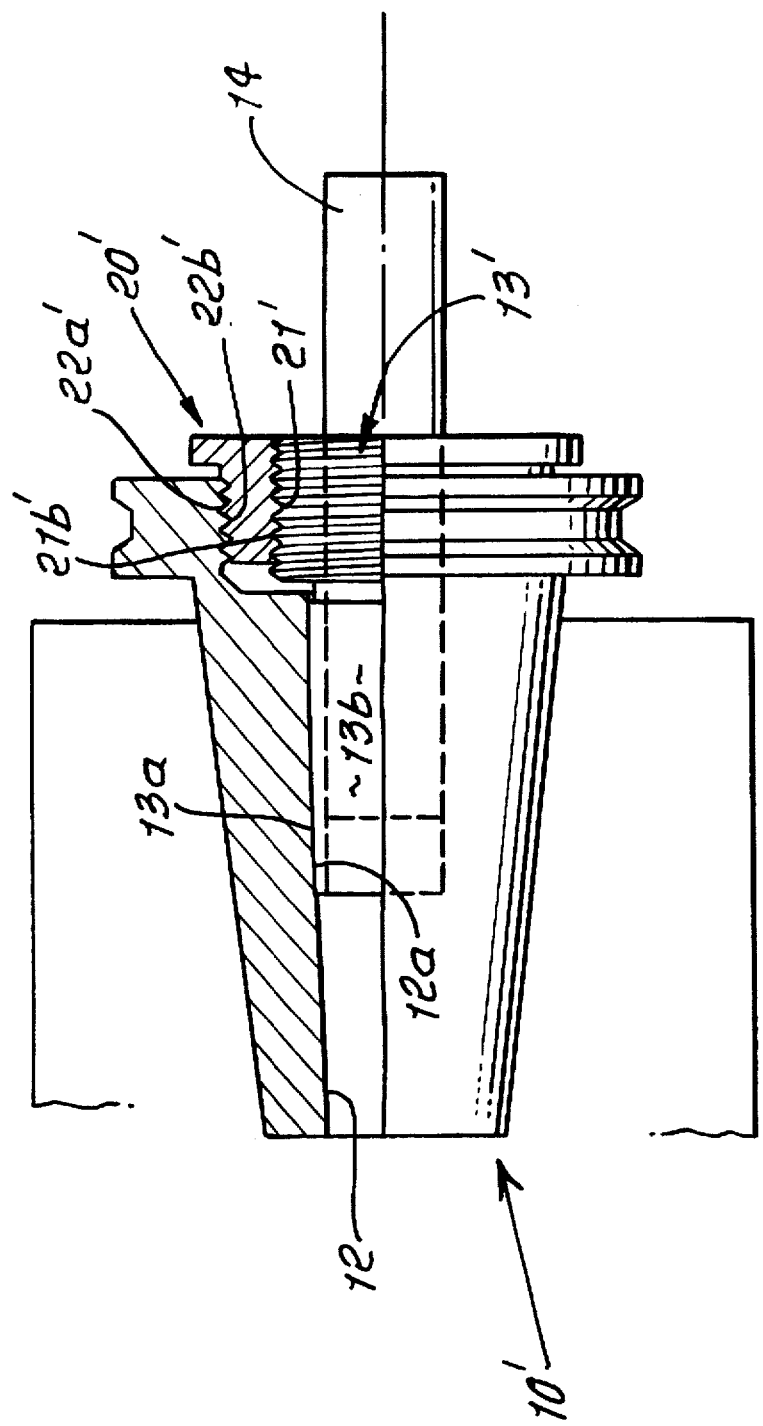
FIG. 2 is a view like FIG. 1 showing another form of such an assembly.

In FIG. 1, the differential threads are at the inner side of the nut-type connector sleeve 20; whereas, in FIG. 2, the threads 22*a'* on the connector member 20', are at the outer side of that member, and engage work holder threads 22*b'* at a bore provided in the work holder 12'. The modified collet appears at 13', and provides differential threads at 21*b'*. Other features remain the same, as in FIG. 1.

Reference is now made to further details of the differential threads, which may be of the type disclosed in U.S. Pat. No. 4,603,889, to Welsh.

In accordance with FIG. 4, the pitch (lead) of rightward facing flanks 56 on the threads joining the left end of the differentially threaded connector to the rightward end of the work holder is slightly "finer" (less coarse) than the pitch (lead) of leftward facing flanks 58 on the threads joining the right end of the connector to the rightward end of the collet; and application of torque generates a tensile force between the threads in opposite ends of the connector 20'. This torque is reacted or resisted by the sum of friction between opposing load flanks, bending and shear, or bending and tensile forces in the load flanks and roots of opposite sets of threads, and ultimately by tension in the body of the connector, which is matched by an increasing compression force in the opposing surfaces 12*a* and 13*a* of the collet and work holder, compressing the collet to grip the work shank 14.

In the context of load line fastening systems, finer (less coarse) thread pitches or leads means that one of the threads in the differential set is numerically higher than the other. For illustration, assume the pitch of the box threads in the left end of the differentially threaded connector, which engage pin threads on the rightward end of the work holder, is exactly 5.0 millimeters. A normal single start 5.0 mm thread measures 0.196850 inches between common points on the thread form, or a bolt with 5.0 mm threads would advance through a nut 0.196850 inches per turn.

At the other (right) end of the differentially threaded connector, assume that the pitch of the threads, which engage the pin threads on the rightward end of the collet, is exactly 5 threads per inch. A single start 5 threads per inch thread measures 0.20000 inches between common points, or a bolt with "-5" threads would advance through a nut 0.20000 inches per turn.

Combining these two "standard" threads—one metric, the other an inch series—in the differentially threaded connector yields a net closing rate (NCR) of 0.20000 minus 0.196850 or 0.00315 inch per turn. Thus, after the collet bottoms into the work holder bore, continuing to turn the connector with respect to the two stationary work holder and collet causes pulling of the connector onto the collet faster than it is displaced from the work holder. Each 90° the differentially threaded connector is turned, with respect to the radially fixed collet and work holder displaces the collet into the work holder by 0.0007875 inches. Other dimensions can be employed.

I claim:

1. Apparatus for adjusting the grip of a tubular collet upon work, the collet receivable in a bore formed by a holder, comprising in combination with said collet:

a) a rotatable connector member having first and second thread connections to said collet and to said holder, respectively, b) said thread connections characterized as differential, with respect to said collet and to said holder, whereby as said member is rotated, the collet closes toward the work, with high mechanical advantages, c) said collet having opposite ends, the first thread connection including threads on the collet, the collet having an unthreaded portion, the collet having a longitudinal axis and opposite ends, the collet having slits therein, at least a first one of said slits extending from one end of the collet and longitudinally through said threads on the collet and then into said unthreaded portion, to terminate in spaced relation from the opposite end of the collet, at least another of said slits extending longitudinally into said threads and also into said unthreaded portion of the collet to terminate in spaced relation from both of said collet ends.

2. The combination of claim 1 wherein said rotatable member is located at least in part externally of said bore.

3. The combination of claim 1 wherein said member is received at least in part in said bore.

4. The combination of claim 1 wherein said connector member is received substantially completely in said bore.

5. The combination of claim 1 wherein said first and second thread connections have first and second threads, respectively, the first thread having first pitch, and the second thread having second pitch, said first and second pitches being different.

6. The combination of claim 1 wherein the collet has a conical outer surface portion to engage a conical inner surface portion of the holder, said one slit extending to said conical outer surface portion.

7. The combination of claim 1 wherein the connector first thread connection includes first threads having first load flanks which face in one axial direction, and the connector second thread connection includes second threads having second load flanks which face in the opposite axial direction, the first flanks defining a first pitch and the second threads defining a second pitch, said pitches being different.

8. The combination of claim 7 wherein said first and second threads define a common axis, the first thread being at a first radial distance from said axis, and the second thread being at a second radial distance from said axis, said first and second radial distances being different.

9. The combination of claim 8 wherein one of said first and second threads is located radially inwardly of the other.

10. The combination of claim 1 wherein said differential thread connection and slits provide a means for collet closing toward the work at a rate less than 0.00500 inch per 360° turn of said rotatable member.

* * * * *